INVENTORS
Milton C. Neuman
Kenneth A. Riach

BY Walter G. Finch
ATTORNEY

United States Patent Office 3,172,513
Patented Mar. 9, 1965

3,172,513
POWER-OFF BRAKE WITH CLUTCHED RESET MECHANISM
Milton C. Neuman, Champlin, and Kenneth A. Riach, Minneapolis, Minn., assignors, by mesne assignments, to the United States of America as represented by the Secretary of the Navy
Filed June 12, 1961, Ser. No. 116,366
1 Claim. (Cl. 192—19)

This invention relates generally to brakes, and more particularly it pertains to a wet disk type fluid-actuated combination brake and manual drive.

Motor driven machines especially of the automatic control type require predictable torque brakes. Furthermore, such machines sometimes have a tendency to drift in their stopped condition. An effective counter-measure is a brake action applied in opposite phase with respect to the "on" signal.

It is an object of this invention to provide a fail-safe brake which is released only upon the application of fluid pressure and which is fluid immersed for unvarying braking torque characteristics.

Another object of this invention is to provide a fluid immersed and fluid actuated disk type brake with a positively lockable manual positioner for torqueing the load shaft when the brake is on.

Other objects and advantages of this invention will become more readily apparent and understood from the following detailed specification and accompanying drawings in which.

Figure 1:
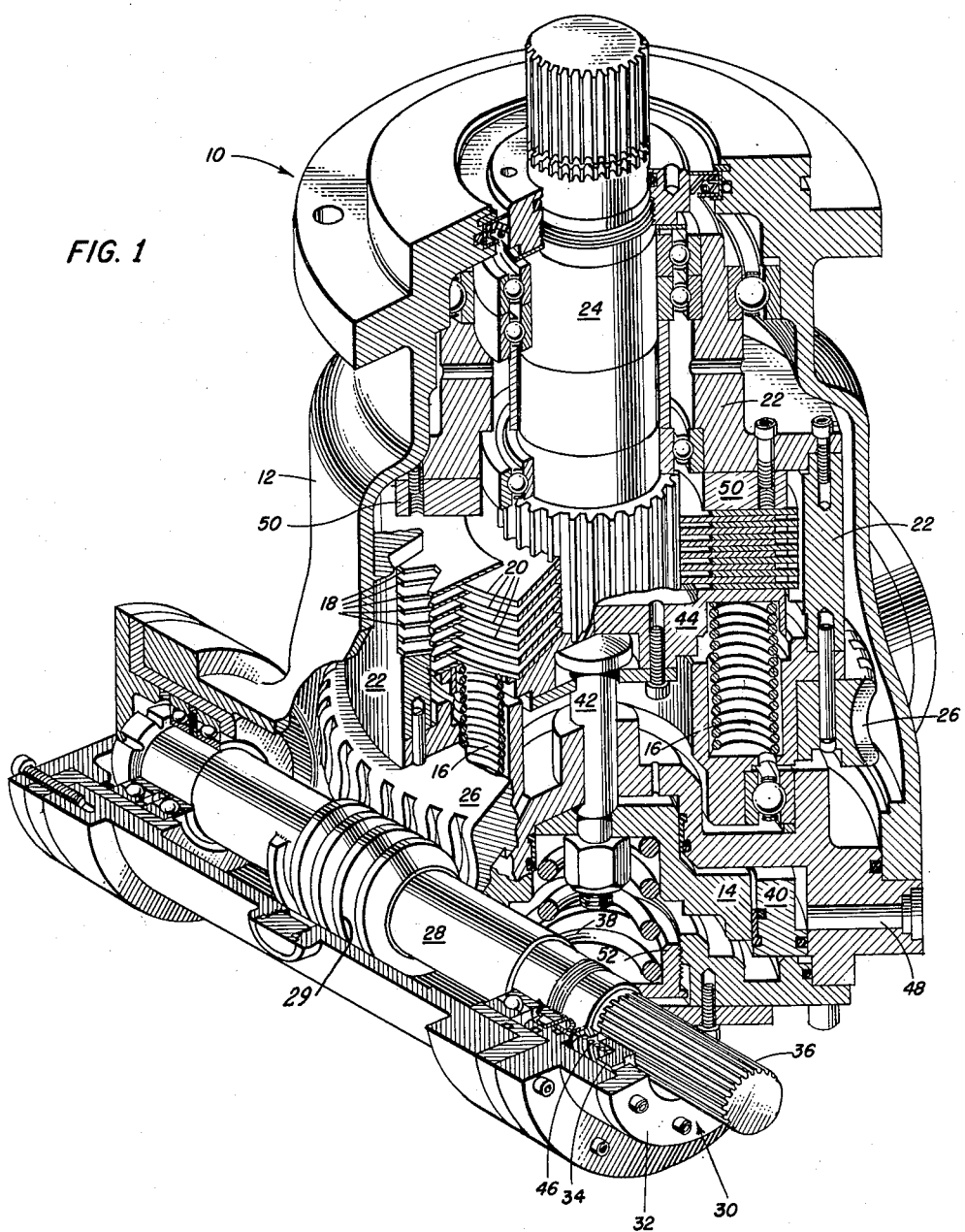
FIG. 1 is a cutaway perspective view of a power-off brake incorporating features of this invention.
Figure 2:
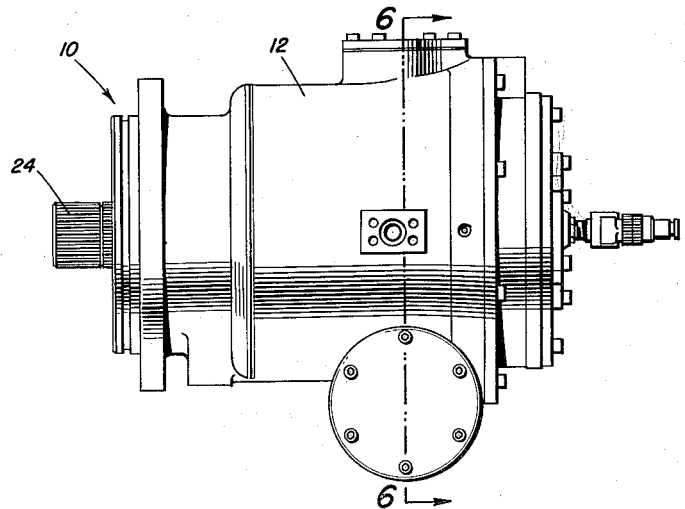
FIG. 2 is an elevation of the power-off brake rotated 90° counterclockwise from the vertical position shown in FIG. 1.
Figure 3:
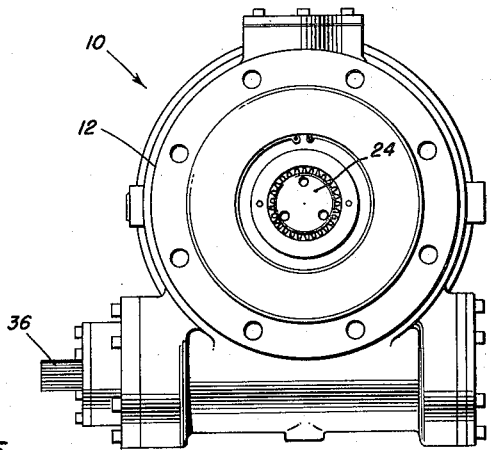
FIG. 3 is an elevation of the power-off brake of FIG. 1 rotated 90° horizontally to the position shown in FIG. 2.
Figure 4:
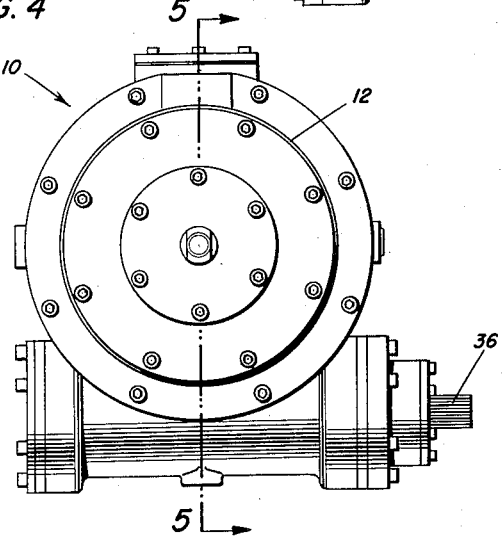
FIG. 4 is an elevation of the power-off brake rotated 180° horizontally to the position shown in FIG. 3.

As shown in FIGS. 1 to 6, the novel power-off brake is designated generally by reference numeral 10. The power-off brake 10 consists generally of a flanged case 12 which is adapted to be bolted onto a rotatable shaft machine, not shown.

Figure 5:
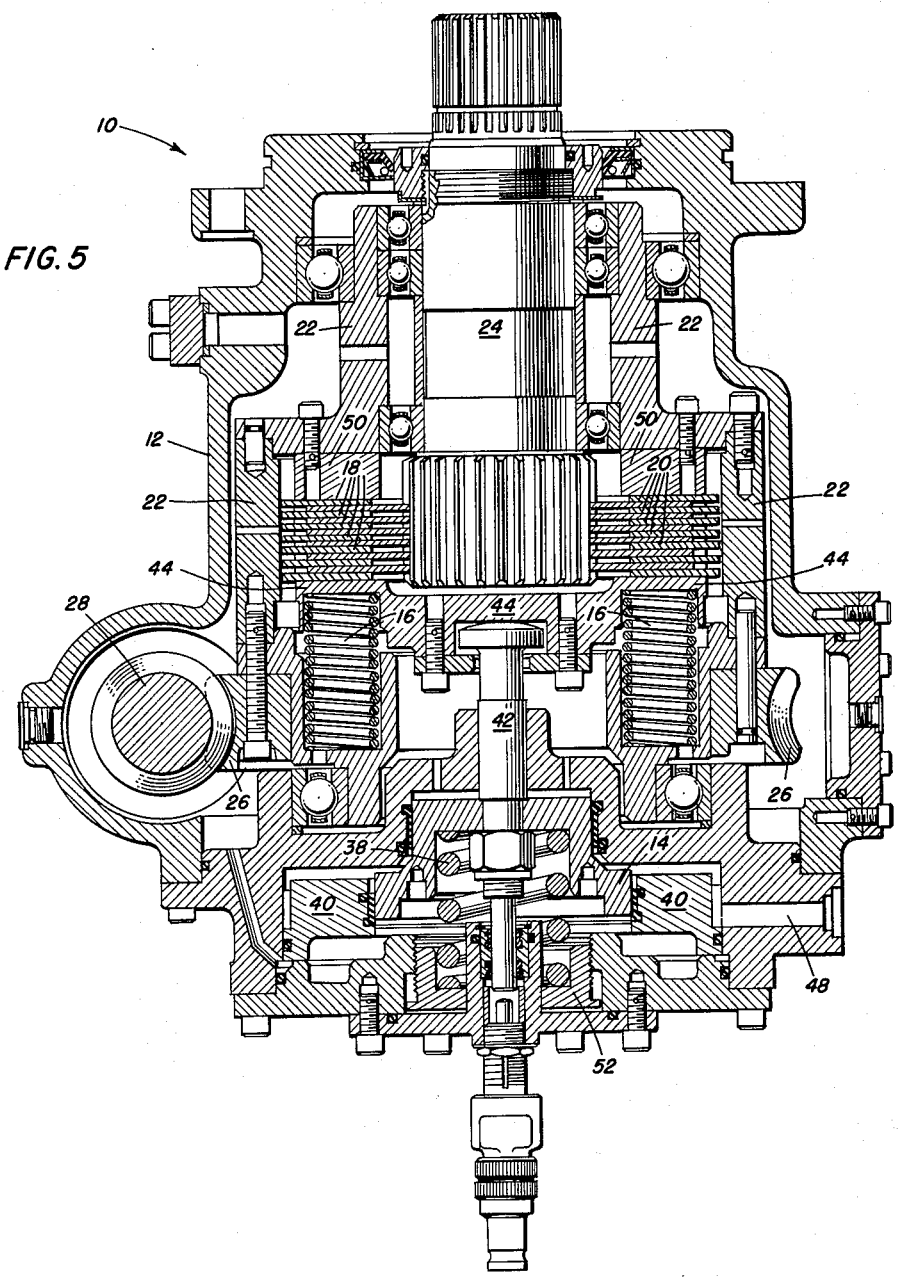
FIG. 5 is a cross-section of the power-off brake taken along line 5—5 of FIG. 4.

The brake 10 is released by hydraulic or pneumatic pressure acting on an annular piston 14 as shown best in FIGS. 1 and 5, and it is held in the set position by a plurality of compression coiled spring 16 applying a load to a plurality of interleaved friction disks 18 and 20.

The load which it is intended to decelerate or hold is coupled to a splined shaft 24. The internal end of shaft 24 is also splined to accept a series of the flat steel friction disks 20, as shown best in FIGS. 1 and 5. These friction disks 20 are sandwiched between the friction disks 18 which, in turn, have their outer diameters splined to an internal cylindrical housing 22.

Figure 6:
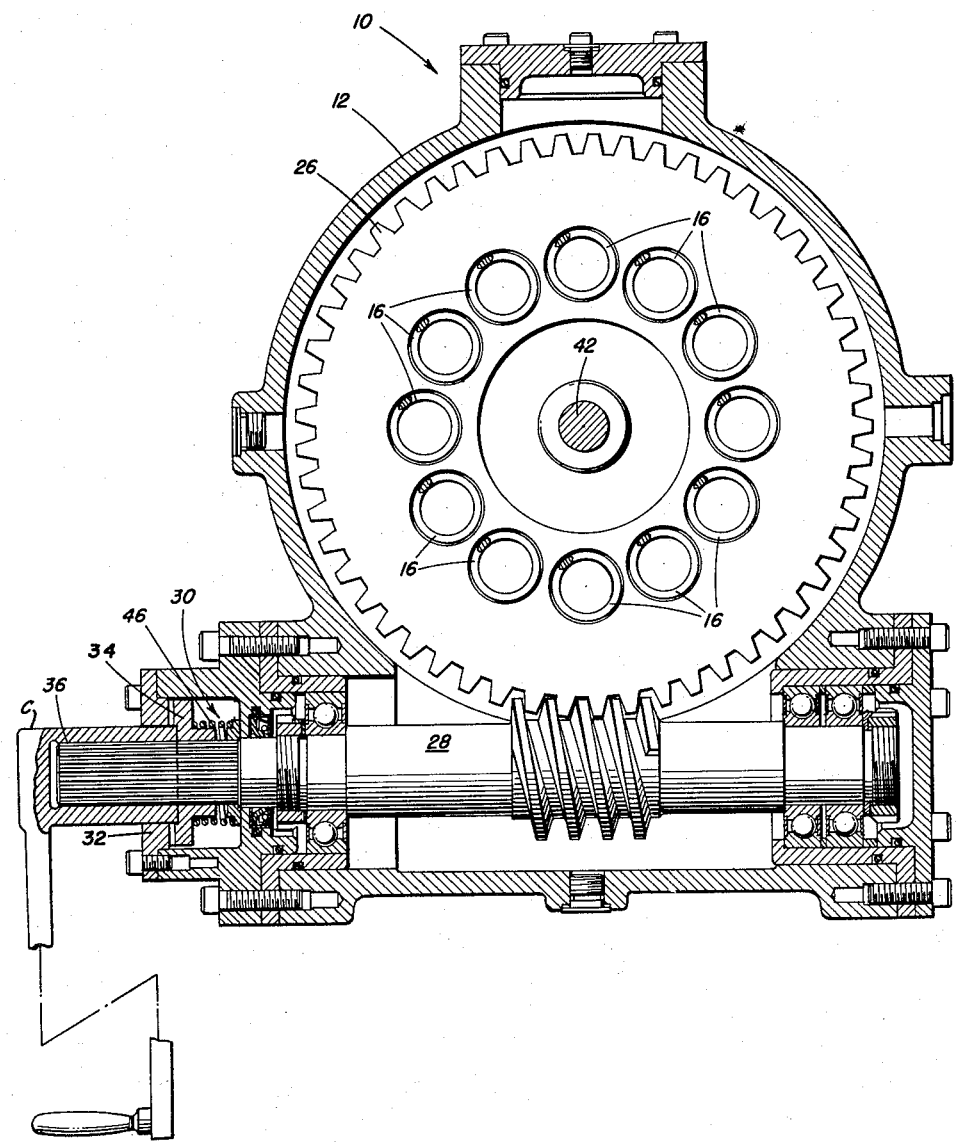
FIG. 6 is a cross-section of the power-off brake taken along line 6—6 of FIG. 2.

This housing 22 is prevented from turning with respect to case 12 when the brake 10 is set, by a wormwheel 26 which is fastened thereto and a meshing wormshaft 28 having a worm gear 29 thereon. The wormshaft 28, in turn, is prevented from rotating by a positive brake 30 which consists of a pair of toothed-jaw brake halves 32 and 34, the latter splined to shaft 36, held together in mesh by a compression coiled brake spring 46, all of which are illustrated in FIGS. 1 and 6.

Twelve of the coiled springs 16 in diametrically spaced arrangement apply constant pressure to urge the friction disks 18 and 20 together through the intermediate agency of a pressure plate 44. A single compression coiled spring 38, shown in FIGS. 1 and 5, adds its force to that of the springs 16. This spring 38 is located under the cup shaped annular piston 14 and can be compressed or relaxed by rotating a backup threaded cup 52.

The annular piston 14 slides within a short cylinder 40, and transmits its movement as well as the compression of spring 38 through a connecting rod 42 to the pressure plate 44.

By adding or subtracting brake disks 18 and 20 from the stack of disks and changing the thickness of a backup spacer 50, a considerable range of braking torques can be achieved. To compensate for variations in materials, a still finer adjustment of brake torque may be accomplished by use of the threaded cup 52 to adjust the lower spring 38 as related.

A conduit 48, as shown in FIGS. 1 and 5, which is connected to an external source of pressure fluid is used to apply a force to the top of the annular piston 14 in opposition to the force of springs 16 and 38 to release the braking action. With the disks 18 and 20 in engagement, the load carrying shaft 24 and the housing 22 are locked together so that there is no relative rotation between the load carrying shaft 24 and the housing 22. The wormgear 26 securely fastened to the housing 22 is in mesh with the worm on the shaft 28. By turning the shaft 28 the coupled shaft 24 and the housing 22 may be rotated as a unit. The shaft 28 is locked against rotation by the brake halves 32 and 34. The insertion of the hand crank C over the splined end of the shaft 28 and the forcing of the hub of the crank onto the shaft and into engagement with the brake half 34 permits the brake half 34 to be moved along the splined shaft 28 against the coil spring 46, unlocking the brake and permitting the turning of the shaft 28 and the coupled housing 22 and the load carrying shaft 24 as a unit by the crank C.

The case 12 is filled with oil to provide lubrication and corrosion protection for all operating parts of the assembly of brake 10. The brake disks 20 have fibercork faces bonded to them which provide smooth deceleration and uniform braking torque when submerged in oil. Experience has shown that a wet brake 10 as described is much superior to the customary brakes with dry brake faces because the torque characteristics of the latter are unpredictable due to glazing and inadvertent admission of oil.

Obviously many modifications and variations of the present invention are possible in the light of the above teachings. It is, therefore, to be understood that within the scope of the appended claim the invention may be practiced otherwise than as specifically described.

What is claimed is:

In a wet disk type brake having a load carrying shaft, a housing receiving one end of the shaft, a plurality of disks attached to the shaft and within the housing, a second plurality of disks attached to the housing, with the disks of the shaft alternating with the disks of the housing, spring means normally urging the disks into contact to prevent relative rotation of the shaft and housing, hydraulically operated means for relieving the spring pressure thereby permitting relative rotation of the shaft and housing, and a wormgear attached to and rotating with the housing, the combination of a worm carried on a wormshaft having a splined extended end, said worm being in engagement with the wormgear of the housing, with a positive brake slidably mounted on the splined end of said wormshaft and manually operated means slidable on said splined shaft for engaging the brake and releasing said wormshaft, said manually operated means rotating the housing and the load carrying shaft as a unit through said wormshaft and wormgear.

References Cited by the Examiner
UNITED STATES PATENTS

| | | |
|---|---|---|
| 2,150,950 | 3/39 | Thoma. |
| 2,429,702 | 10/47 | Thompson. |
| 2,518,833 | 8/50 | Stevens _____ 192—18 |
| 2,598,633 | 5/52 | Baldwin _____ 192—15 X |
| 2,743,792 | 5/56 | Ransom. |
| 2,755,687 | 7/56 | Danly _____ 192—14 X |
| 2,778,456 | 1/57 | Ross _____ 188—170 |
| 2,883,021 | 4/59 | Hill. |
| 2,930,460 | 3/60 | Isaacson. |
| 2,957,521 | 10/60 | Greegor. |

DAVID J. WILLIAMOWSKY, *Primary Examiner.*

THOMAS J. HICKEY, *Examiner.*